(12) United States Patent
Gaunce

(10) Patent No.: US 10,309,019 B2
(45) Date of Patent: Jun. 4, 2019

(54) CORROSION PROTECTION METHODS FOR THE PROTECTION OF THE NATIONAL INFRASTRUCTURE OF COPPER/IRON, COPPER, LEAD/IRON POTABLE WATER DISTRIBUTION SYSTEMS AND THE NATIONAL IRON-BASED INFRASTRUCTURE

(71) Applicant: Frank Seth Gaunce, Romeoville, IL (US)

(72) Inventor: Frank Seth Gaunce, Romeoville, IL (US)

( * ) Notice: Subject to any disclaimer, the term of this patent is extended or adjusted under 35 U.S.C. 154(b) by 0 days.

(21) Appl. No.: 16/045,929

(22) Filed: Jul. 26, 2018

(65) Prior Publication Data

US 2019/0040533 A1 Feb. 7, 2019

Related U.S. Application Data

(60) Provisional application No. 62/605,091, filed on Aug. 1, 2017.

(51) Int. Cl.
| | | |
|---|---|---|
| C23F 13/02 | (2006.01) | |
| C23F 15/00 | (2006.01) | |
| C23F 13/14 | (2006.01) | |
| E03B 1/04 | (2006.01) | |
| H02G 9/00 | (2006.01) | |
| H02G 3/08 | (2006.01) | |

(52) U.S. Cl.
CPC .............. C23F 15/00 (2013.01); C23F 13/14 (2013.01); E03B 1/04 (2013.01); H02G 9/00 (2013.01); *C23F 2213/32* (2013.01); *H02G 3/08* (2013.01)

(58) Field of Classification Search
CPC ...... C23F 13/02; C23F 13/06; C23F 2201/00; C23F 2213/30; C23F 2213/31; C23F 2231/32; E03B 7/00–7/14; E03B 1/04–2001/045; H02G 9/00–9/12
USPC ....................................... 204/196.01–196.38
See application file for complete search history.

(56) References Cited

U.S. PATENT DOCUMENTS

| | | | | |
|---|---|---|---|---|
| 1,962,696 A | * | 6/1934 | Rhodes ................... | H01B 7/28 138/DIG. 6 |
| 3,033,775 A | | 5/1962 | Chevigny et al. | |
| 3,477,930 A | | 11/1969 | Crites | |
| 3,769,521 A | * | 10/1973 | Caldwell ................. | C23F 13/04 166/351 |
| 4,370,211 A | | 1/1983 | Hybler | |
| 5,006,214 A | * | 4/1991 | Burchnell ............... | C23F 13/02 204/196.16 |
| 5,139,634 A | | 8/1992 | Carpenter et al. | |
| 5,415,745 A | | 5/1995 | Pultan et al. | |
| 6,103,097 A | | 8/2000 | Russell | |
| 6,471,851 B1 | * | 10/2002 | Bennett ................... | C23F 13/06 204/196.1 |
| 6,955,746 B2 | | 10/2005 | Yule | |
| 7,186,327 B1 | | 3/2007 | Russel | |
| 7,582,195 B2 | | 9/2009 | Benham | |
| 8,636,877 B2 | | 1/2014 | Palmer | |
| 2004/0099539 A1 | * | 5/2004 | Yule ........................ | C23F 13/02 205/734 |
| 2004/0112737 A1 | * | 6/2004 | Benham .................. | C23F 13/04 204/196.11 |
| 2007/0158184 A1 | * | 7/2007 | Benham .................. | C23F 13/04 204/196.06 |
| 2008/0204274 A1 | | 8/2008 | Peters | |
| 2009/0252986 A1 | * | 10/2009 | Owen ....................... | C23C 4/02 428/623 |
| 2012/0171073 A1 | * | 7/2012 | Ontiveros Balcazar .................... | C22C 18/00 420/518 |
| 2012/0205256 A1 | | 8/2012 | Catte | |
| 2012/0298525 A1 | * | 11/2012 | Zannanzadeh .......... | C23F 13/04 205/724 |
| 2015/0259807 A1 | | 9/2015 | de Pierola | |
| 2015/0368809 A1 | | 12/2015 | Atkins et al. | |
| 2017/0029961 A1 | | 2/2017 | Gaunce | |
| 2017/0211191 A1 | | 7/2017 | Gaunce | |
| 2017/0356588 A1 | | 12/2017 | Gaunce | |

OTHER PUBLICATIONS

NACE ("Module 4 Cathodic Protection", 2005, pp. 1-29 (Year: 2005).*
Moore (NDWC Promotion) (Year: 2007).*
McIntosh ("Grounding Where Corrosion Protection is Required", IEEE Transactions on Industry Applications, vol. IA-18, issue: 6, Nov. 1982, pp. 600-607). (Year: 1982).*
Moore (NDWC Promotion) (Year: 2014).
Ashworth (Principles of Cathodic Protection, 3rd edition, vol. 2, pp. 10:3-10:28, 2010, http://booksite/elsevier.com/brochures/shreir/Pdf/Principles_of_Cathodic_Protection.pdf).
GB Search Report for corresponding GB Application No. GB1812467.7 dated Feb. 1, 2019, pp. 1-4.
Trimble, et al., The Conflicts and Solutions to Complying with the Grounding Revisions of the 2005 National Electrical Code for Cathodically Protected Facilities, Paper No. PCIC-2007-25, IEEE 2007 PCIC Record of Conference Papers, pp. 1-6.

(Continued)

*Primary Examiner* — Alexander W Keeling
(74) *Attorney, Agent, or Firm* — Honigman LLP

(57) ABSTRACT

The methods and systems of lower the grounding potential of an AC electrical grid for protecting a potable water delivery systems from corrosion due to a chemical redox reaction between protective concentration of disinfection chemicals in water and iron, lead and/or copper metal pipes within the potable water delivery system. The methods protect the surface of interactive metals more noble than zinc. These methods are also effective in corrosion protection of the national metallic infrastructure of metals more noble than zinc, such as street signs, lights stands, bridges, and any systems connected to the electrical grid.

3 Claims, No Drawings

(56) References Cited

OTHER PUBLICATIONS

Mitolo, et al., Interactions between Cathodically Protected Pipelines and Grounding Systems, 2006 IEEE/IAS 52nd and Commercial Power Systems Technical Conference (I&CPS), pp. 1-6.

* cited by examiner

CORROSION PROTECTION METHODS FOR THE PROTECTION OF THE NATIONAL INFRASTRUCTURE OF COPPER/IRON, COPPER, LEAD/IRON POTABLE WATER DISTRIBUTION SYSTEMS AND THE NATIONAL IRON-BASED INFRASTRUCTURE

CROSS-REFERENCE TO RELATED APPLICATION

This application claims the benefit of U.S. provisional application 62/605,091 filed on Aug. 1, 2017, the entirety of which is incorporated herein by reference.

FIELD

This disclosure relates to potable water delivery systems, and more specifically, systems and methods for corrosion reduction and/or prevention of the interior and exterior of iron, copper, and lead components of the water delivery system from an interior chemical redox reaction and an exterior surface electrolytic cell reaction between the protective concentration of disinfection chemicals in water and the iron, lead and copper metal pipes of the delivery system. These methods are also effective in corrosion protection of the national metallic infrastructure of metals more noble than zinc, such as street signs, lights stands, bridges, and any systems connected to the electrical grid.

BACKGROUND

Typically, a potable water distribution system includes an iron main and distribution laterals of iron, lead, and/or copper piping to a point of use. Potable water often includes disinfecting chemicals, such as chlorine gas and/or hydrogen peroxide and the like, to disinfect or purify the water. In some circumstances, as described more below, the disinfecting chemicals will corrode all three metals of the individual distribution systems even at low protective concentrations (such as about 1 to about 4 ppm) of disinfectants. Failing copper pipelines, for example, due to internal corrosion tend to case pinhole water leaks and the like. The cause and cure of this corrosion was unknown because it was previously believed that the concentration of disinfecting chemicals in the potable water was too low to cause such corrosion. Currently, it have become apparent that the disinfectants in potable water are corrosive to the metals of the distribution system, requiring replacement of some components of the system. Traditionally, the water distribution system and the electricity distribution grid have been treated as separate systems. This current understanding permits integration of these systems for greater efficiency.

SUMMARY

In one approach or embodiment, a system is provided to reduce and/or prevent potable water pipeline corrosion from redox reactions of residual disinfecting chemicals. In one aspect, the system reduces and/or prevents such corrosion by changing the ground potential of an AC electrical grid that is integrated with the potable water pipeline system. In another aspect, the system includes potable water supply pipelines including at least one of copper pipelines, lead pipelines, iron pipelines and combinations thereof and wherein the potable water supply pipelines include portions thereof that are free of iron mainlines, include corroded iron mainlines, and/or include combinations thereof. The system also includes potable water flowing through the potable water supply pipelines. The potable water includes residual levels of one or more disinfecting chemical therein. The potable water pipeline system is associated with and/or integrated with an AC electrical grid wherein the null leg of the AC electrical grid is conductively connected to at least a portion of the potable water supply pipelines. The system and, in particular, the AC electrical grid, also includes a grounded copper anode electrically connected to the leg of the AC electrical grid. In an aspect of the disclosure herein, an additional grounded anode is of a material having a standard reduction potential of about −0.7 volts referenced to a standard hydrogen electrode (or "SHE" for short). Such systems herein lower the grounding potential of the AC electrical grid to about −1.1 volts referenced to the grounded copper anode of the electrical grid's measuring system (or, "SGE" for short).

In other approaches or embodiments, the system of the previous paragraph may be combined with one or more optional features either individually or in any combination thereof. These optional features include: potable water supply pipelines delivering potable water having no more than about 4 ppm of disinfecting chemicals including at least one of chlorine gas, hydrogen peroxide, hypochlorous acid or a salt thereof, and combinations thereof; and/or wherein the potable water supply pipeline includes portions thereof supplying the potable water within a turbulent flow regimen (or at least creating a turbulent flow regimen within a portion of the water supply pipeline) having a Reynolds number greater than about 2100 and wherein the systems herein prevent and/or reduce corrosion within pipeline areas having such turbulent flow or at least downstream of a pipeline feature causing such turbulent flow; and/or wherein the grounded anode is selected from a metal less noble than copper; and/or wherein the grounded anode is combined with a separate copper ground wherein both the grounded anode and the separate copper ground are electrically connected and/or directly electrically connected to the AC electrical grid; and/or further including a variable output AC rectifier transformer electrically connected to the AC electrical grid and to the grounded anode; and/or wherein the grounded anode is provided at the electrical entry box of the AC electrical grid to a building structure having the potable water supply pipelines; and/or wherein the variable output AC rectifier transfer is provided at the electrical entry box of the AC electrical grid to a building structure having the potable water supply pipelines; and/or wherein the potable water after passing through the system has levels of lead below about 15 ppb.

In another approach or embodiment, a method is provided of reducing the level of potable water pipeline corrosion by altering the ground potential of an associated AC electrical grid. In one aspect, the method includes lowering the ground potential of an AC electrical grid by at least about 1.0 volt below the standard ground potential of copper (referenced to SHE) by connecting a grounded electrode to the AC electrical grid of a material having a standard reduction potential of about −0.7 or less volts (that is, more negative) referenced to a standard hydrogen electrode. The methods include an AC electrical grid conductively grounded to a potable water supply pipeline needing corrosion protection. The potable water supply pipelines include at least one of copper pipelines, lead pipelines, iron pipelines and combinations thereof and wherein the potable water supply pipelines include portions thereof free of iron mainlines, include corroded iron mainlines, and/or include combinations thereof. The potable water flows through the potable water supply pipelines and includes residual levels of one or more disinfecting chemical therein. In an aspect, the lowering of the ground potential of the AC electrical grid reduces and/or prevents the level of corrosion in the potable water pipelines by preventing and/or reducing a redox reaction between one of the copper pipelines, the lead pipelines, and/or the iron pipelines and the residual levels of one or more disinfecting chemicals within the potable water.

In other approaches or embodiments, the method of the previous paragraph may be combined with and/or include optional features in any combination. These optional features include wherein the ground potential of the AC electrical grid is lowered at least about 1.0 to about 2.0 volts below the standard ground potential of copper (referenced to the SHE); and/or wherein the grounded electrode has a standard reduction potential of about −0.7 to about −1.2 volts relative to the SHE (preferably, about −0.7 to about −0.8 volts referenced to the SHE); and/or further including a variable output AC/DC rectifier transformer supplied from the AC system; and/or wherein the AC/DC rectifier transformer is installed within at least one point of service entry box to a structure having the potable water supply pipelines; and/or wherein the potable water supply pipelines delivers potable water having no more than about 4 ppm of disinfecting chemicals including at least one of chlorine gas, hydrogen peroxide, hypochlorous acid or a salt thereof, or combinations thereof, and/or wherein the potable water supply pipeline includes portions thereof supplying the potable water within a turbulent flow regime having a Reynolds number greater than about 2100; and/or wherein the grounded anode is combined with a separate copper ground; and/or wherein the potable water after passing through the system or potable water supply pipelines has levels of lead below about 15 ppb. These methods are also effective in corrosion protection of the national metallic infrastructure of metals more noble than zinc, such as street signs, lights stands, bridges, and any systems connected to the electrical grid.

DETAILED DESCRIPTION

Construction of water systems using iron piping for mains and distribution laterals was a common and established practice. Copper and or lead piping was also used as a typical lateral pipe for domestic and facility potable water distribution systems. The copper or lead plumbing systems were connected directly to the iron pipe. Because iron is anodic to copper or lead, the iron piping acted as a sacrificial anode to the copper or lead piping, thus protecting the exterior of the copper and lead piping from corrosion. However, recently discovered copper piping failures are due to internal corrosion causing pinhole water leaks and the like. It was not previously believed that the low concentration of disinfecting chemicals in potable water would corrode the copper and/or lead.

More recently, plastic piping has become more prevalent in potable water delivery systems and, in particular, being used in place of the iron piping mainlines. This change, however, from iron to plastic removed the unintended iron sacrificial anode that protected the copper and lead piping from corrosion by the potable water. The recent occurrence of interior corrosion, causing pinhole leaks in copper piping systems, for example, and high lead in the distributed potable water in lead piping systems is the result of this substitution of plastic pipe for the traditionally-used iron pipe.

While not wishing to be limited by theory, this interior surface corrosion of the pipeline may be caused by a redox reaction between the disinfecting chemicals used to produce the potable water and the copper, iron, and lead pipe. It is believed that, in some approaches, at least turbulent flow (that is, a flow regime having a Reynolds number greater than 2100, greater than 2300, or in other approaches, greater than 4000) in select or isolated areas of the piping system provides the activation energy needed to initiate the reaction and eventually the location of the corrosion site of the potable water.

To produce potable water, particulate free raw water is often treated with oxidizing chemicals such as chlorine gas, or hydrogen peroxide, and/or hypochlorous acid or a salt thereof to destroy pathogens harmful to health. These reagents are normally added in stoichiometric excess to provide a reserve for additional purification should the potable water become contaminated during delivery. The concentrations of these purification chemicals remaining in the potable water are typically not great enough to cause a spontaneous redox reaction with copper and lead at room temperature with the inside surface of the copper and lead piping without the introduction of other energy from an outside source such as turbulent fluid flow, sound, mechanical vibration, and the like. These chemicals generally do not cause general corrosion of the pipe interior surface when the water flow is laminar (that is, an Re less than about 2100) because not enough energy is generated by the laminar fluid flow to satisfy the activation energy needed to initiate the redox reaction. However, a higher temperature and/or sufficiently turbulent flow reduces the amount of activation energy required to initiate the redox reaction, possibly allowing for a spontaneous corrosion reaction at comparable potentials.

When water flow is turbulent (that is, a Reynolds number above 2100, or above 2300, or above 4000) the corrosion becomes more random resulting in a rough interior surface. When turbulence is caused by high flow, pipe joints, rough surface, severe directional change as in a 90 degree elbow, solder prills, etc., vortices and eddies form in such isolated interior piping areas on the downstream side of these irregularities, corrosion may occur. These isolated vortices create energy and cause bubbles breaking the diffusion layer on the pipe surface. The bubbles accumulate in the stationary eddies where the turbulence-created energy supplies the necessary activation energy to initiate an anodic chemical redox reaction between the disinfectant chemicals and the interior of the copper, iron, or lead pipe. This eventually creates a pit in the copper pipe wall and rough surface in lead and iron interior. With copper this mechanism continues until the pipe wall is penetrated producing a pinhole leak. This tends to explain why pipe corrosion is often located downstream of such surface irregularities.

When the reactants are present in normal concentration, and the system is at or beyond the reaction's oxidation potential, and enough activation energy is present, a corrosion reaction ensues. When the copper, lead, or iron pipe is one of the reactants, it is corroded removing some of the metal as a copper ion, for instance. Using the copper pipe as an example, the cuprous copper ion reacts with the chloride ion and the nascent oxygen ion present from the purification disinfectant chemicals process to produce cuprous chloride, cuprous oxide, and cuprous oxichloride. These insoluble compounds are carried down-stream from the reaction site where part of the insoluble portion is deposited on the pipe wall creating a blue/green stain of corrosion products on the pipe interior and the remainder is dissolved in the flowing water. Electrons are exchanged between the participating chemical elements in this redox reaction but no external electrical current is generated, as is the case with electrolytic cell reactions involving sacrificial anode and the copper cathode. Similar circumstances may lead to lead piping corroding the interior surfaces of lead pipes leading to the presence of lead in the water supply.

Previously, an iron mainline pipe or other iron piping acted as a sacrificial anode protecting the exterior and interior surface copper plumbing from corrosion and was an unintended consequence of using iron pipe. The iron pipe was sacrificial in that it supplied electrons to the cathodic electrolytic reaction that protected the external surface of the copper plumbing from corrosion. In the context of controlling the redox reaction causing the internal surface corrosion of the copper plumbing, the iron pipe acting as a potential anode but, did not corrode to provide electrons to the redox reaction, but lowered the cathodic potential of the copper, thus causing the redox reaction to be cathodic, and thus preventing the corrosion of the interior surface of the copper pipe.

However, when the iron piping or iron mainline is removed from the system and replaced with plastic piping no longer provide cathodic protection to the lead and copper piping, the above described redox reaction can occur upon turbulent or other activation to corrode the copper and/or lead piping. Thus, isolated copper or lead piping, in the context of its redox reaction with the disinfecting chemicals, is at a potential that causes the redox reaction to be anodic, thus causing the copper and or lead piping to be corroded. When activated, the unintended function of the iron pipe acting as an anode was to raise the potential of the copper to the cathodic potential of the redox reaction, thus preventing the corrosion of the copper and lead pipe interior, but otherwise it does not participate in the redox reaction.

When the copper and lead are isolated from the iron piping, the metals are corroded in the order Zn, Fe, Pb, Cu. Previously, so long as the Zn, Fe, Pb, Cu were in contact with the iron main, they were not corroded. However, they are not protected from corrosion by the disinfectant, electrochemically, when iron piping is corroded away and/or replaced with plastic piping. When the iron is corroded away or removed, the lead and copper are next corroded. With the lead pipes, the corrosion is evidenced by the increased content of lead in the delivered water. In the case of copper, the corrosion tends to be very local, resulting in pipe pinhole leaks. For safety reasons the metal components of the potable water system and the iron components of a national infrastructure are typically grounded to the electrical grid matrix. Grounded copper is arbitrarily declared to be at zero volts, which is not a safety hazard to personnel.

The methods and systems herein include a potable water supply infrastructure being electrically, conductively integrated and/or grounded with the AC electric grid. Currently, the grounding systems are already electrically interconnected at the reduction potential of copper (that is, about +0.52 volts referenced to a standard hydrogen electrode or "SHE" or alternatively about 0 volts referenced to a standard copper ground electrode or "SGE" as measured on a common voltmeter), but at such potential the integrated systems will not protect the potable water systems from the corrosion described above. But, if the potential of the AC electrical grid is lowered to the reduction potential of at least about −1.1 volts or more negative reference to the SGE, it will prevent the redox reaction from corroding the interior of the described above from corroding the iron, copper, and lead pipelines in the potable water delivery system. In this approach, the systems and methods herein lower the ground potential of the AC electrical grid about 1.0 to 2.0 volts below the standard potential of the grounded copper electrode SGE. It is also recognized that corrosion of the protected lead pipes using the systems and methods herein will not add lead to the potable water in quantities in excess of EPA standards. The NEARNEST equation predicts that at the reduction potential of about −0.7 volts or lower referenced to the SHE and at the protective concentration of disinfecting chemicals, the equilibrium concentration of lead in the potable water will be several multiples less then EPA's current recommendation of 15 ppb.

The chemical reactions with the disinfectants and the interior of metal pipes are redox reactions that are electrolytically self-contained. That is, the reactants and reaction products share electrons to produce reaction products without creating a shortage of, or an excess of electrons. The reactions go towards the lowest net energy state of the reactants and, hence, the direction of the reaction is controlled in cathode mode by a potential anode (as described herein) or other energy source, such as by an AC/DC transformer-rectifier, supplied from the AC power supply. In the approaches herein, the reaction potential may be from the AC electrical grounding systems, whose potential is lowered to −1.1 volts or more SGE. Reference to the SHE, to at least about −0.7 volts (or more negative referenced to the SHE as described above. In other words, the systems and methods herein lower the reduction potential of the AC electrical grid about 1.0 to about 2.0 volts (referenced to the SHGE) below the standard reduction potential of copper. Lowering the potential of the AC system lower is undesired due to possible side reactions that can occur in the potable water systems due to the disinfecting chemicals such as unwanted hydrogen generation therein. Unless noted otherwise, all voltage potentials described herein are relative to a standard hydrogen electrode or SHE as understood by those of ordinary skill (other methods of measurement may also be described in, for instance, ASTM G215-17 and the like). Those of skill appreciate that the standard hydrogen electrode sets the voltage of hydrogen to 0 as a reference point. A typical volt meter, on the other hand, is scaled to zero at the copper grounding electrode potential (SGE) of the national electrical grid. Unless otherwise specified herein, voltages are referenced to the standard hydrogen electrode or SHE.

In some approaches or embodiments, the copper grounding electrodes directly connected to the electric grid may stay in place and be used in combinations with the additional grounding electrodes of the present disclosure that are also directly connected to the AC. The electric voltage unit, (Pe) copper ground electrode=0; hydrogen electrode ground=0SHE, can be changed to the thermodynamic voltage unit, (Te), by the following equations:

$$Te = (Pe \times 1.12) + 0.521$$

$$Pe = (Te - 0.521) \times 1/1.12$$

$$1 \, v\text{·Te} = 1.51 \, v\,Pe$$

As described above, the redox reactions within the potable water systems leading the corrosion between the participating metals and the disinfectant chemicals are as follows:

1. Iron

$$Fe + HClO = FeCl_2 + FeO + H_2O$$

(Balanced)

$$2Fe+2HClO=FeCl_2+FeCl_2+H_2O$$

2. Lead $$Pb+HClO=PbCl_2+PbO+H_2O$$

(Balanced)

$$2Pb+2HClO=PbCl_2+PbO+H_2O\ PbO$$

3. Copper $$Cu+2HClO=CuCl+Cu_2O+H_2O$$

(Balanced)

$$4Cu+2HClO=2CuCl+Cu_2O+H_2O$$

These are anodic redox reactions that occur at anode potentials. They will proceed spontaneously upon sufficient activation energy (turbulence, etc.) and when the systems are at the ground potential of copper to corrode the interior of the iron, lead, and copper pipes, when in unit Molar concentrations. This is an anodic redox reaction, and at the protective concentration of HClO in potable water, they can be prevented from reacting by raising the cathodic reduction potential to the reduction potentials as described herein.

Many years of unfailing service of copper and lead potable water delivery pipes connected to iron mains attest to the fact that the reduction potential of iron protects copper and lead from corrosion by potable water. Since the copper and lead are not corroded by the potable water, until the iron is removed from the system, and/or by the potable water or disconnected or corroded away, it can be concluded that the copper and lead pipes were previously protected from corrosion by the corroded iron main.

The iron mains of the water distribution system, protect the attached copper and lead delivery pipes from corrosion by the protective concentration of disinfectant, left in the potable water. (Some disinfectant is left in the potable water to protect its purity should it become contaminated during delivery to point of use.) Over decades, the iron mains fail due to corrosion and must be replaced. Currently, it is common practice to replace the iron mains with a non-electrically-conducting plastic. This removes the cathodic corrosion protection of the copper and lead against the disinfectants in the potable water. As a consequence, the lead and copper, in the absence of iron mains, are corroded by the potable water and contaminate the potable water with unacceptable amounts of lead and copper. The copper corrosion creates the currently unexplained pinhole water leaks. The slow leak from a pinhole is evaporated to atmosphere, thus creating a concentrated solution of chlorates/chlorites which corrodes the exterior of the pipe. This is often attributed to acid soil.

Therefore, in order to maintain and extend the life of the potable water delivery systems infrastructure due to the replacement of the iron mains with plastic and/or the corrosion of the iron mains, the methods and systems of the present disclosure add additional corrosion protection to the system by lowering the reduction potential of the iron/lead and the iron/copper systems below the iron/potable water disinfectant chemicals reduction potential as described in the approaches above. Typically, this will be at the reduction potential of at least about −0.7 volts SHG, or about −1.1 to about −2.0 volts SGE, which can be provided by grounding electrodes directly connected to an AC electric grid that has been lowered to −1.1 to −2.0. At the grounding potentials discussed herein, the potable water systems are protected from corrosion by potable water. The AC electrical system potential will be −0.7 to −2 volts relative to a SHE, or, preferably, about −0.7 to about −1.2 volts when measured relative to a standard hydrogen electrode. This potential is about 1.0 to about 2.0 volts below the potential of copper (referenced to the SGE). Alternately, the potential will be from a rectifier transformer supplied from the electrical grid.

Since the copper piping normally is connected to the electrical grounding system, all metal components are electrically connected; the entire system will be protected from corrosion when the electrical grid's null point is lowered to the reduction potential of the grounding electrodes described above. These may also be used to counter potential line loss. When the null point of the electrical grid is lowered to, or below, the reduction potential of about −1.0 to −1.1 SGE volts, most of the metal infrastructure surface of iron, copper, and lead will be protected from corrosion by the potable water and acid rain, excepting where either are allowed to evaporate to dryness on the metal surface.

The previous comments relate primarily to protection of the interior of the potable water distribution piping and particularly to the iron mains since the iron protects the copper and lead in the absence other protective systems. The mode of interior corrosion is by a redox reaction between the protective concentration of disinfectants and the metal pipes. In the past, this has not been recognized as a corrosion problem for lead or copper so long as the iron mains have continued to be used. But, currently, as failing iron mains, due to corrosion or leaks are being replaced with non-conductive plastic, the copper and lead delivery lines are failing. The systems and methods herein of lowering the electrical ground grid to at least about −1.0 to −1.1 volts SGE by changing the copper AC ground to the ground electrodes discussed herein (or combining the copper AC ground with an additional zinc electrode −0.7 SHE as discussed herein) to protect the interior and the exterior of the iron mains, also protects the interior of the copper and lead pipes, in the absence of the iron main. It also protects dedicated sacrificial anodes. Also, the systems described herein protects the potable water system, by acting as a cathode for the cathodic corrosion protection system. Furthermore, any iron that comes in contact with the potable water delivery system, intentionally or unintentionally, is protected from electrolytic corrosion. This assumes that neither potable water nor acid rain is allowed to evaporate or go to dryness on metal surfaces. The cathodic corrosion protection system is unlike the cathodic redox system wherein the cathodic corrosion protection system is an electro-chemical cell wherein a cathodic potential is impressed on the cathode and an electron current generated by the creation of the cathodic ion transferred through the electrolyte to the cathode where it receives an electron from the sacrificial anode to convert it to an element. The electron is transferred from the cathode by a shared metallic conductor to the directional control of a redox reaction.

Typical cathode corrosion protection cell reactions that protect the exterior of a metal cathode by a sacrificial anode follows:

$$Zn+Cu_2O=2Cu+ZnO \quad (1)$$

$$Zn+FeO=Fe+ZnO \quad (2)$$

$$Zn+PbO=Pb+ZnO \quad (3)$$

$$Zn+H_2O=H_2+ZnO \quad (4)$$

Equations 1 through 4 are cathodic, preventing the corrosion of the metal cathode. The copper, lead, and the reversed reactions are anodic, not usually spontaneous, corroding the metal iron, are more strongly protected in the order: copper most, iron least. When all local metal ions have been reduced, the cathodic reactions stop and the system is stagnant, at the reduction potentials discussed herein, with the following exception: when the soil (electrolyte) is acid, water may be reduced, producing hydrogen gas at the protected metal cathode and at the anodes as discussed herein, as in equation (4).

The systems and methods herein utilize a potable water distribution system, the iron-based infrastructure, and the electrical grid in an integrated electrical maze in which the systems are electrically connected and/or electrically grounded together and provides the unique solution to the water distribution system corrosion by altering the grounding potential of the AC system. Thus, this disclosure herein not only protects the interior of the lead, copper, and iron of the water distribution system from corrosion by potable water due to the redox reactions described above, but it may also protect an electrically connected/grounded iron infrastructure from corrosion by ozone and acid rain. Optionally and in some approaches, the grounding potential of the electric grid can be powered from the AC electrical grid through AC/DC transformer converters and/or alternately by multiple anodes having the potentials discussed herein. The grounding potential of the entire integrated systems is lowered to about −1.1 volts (SHE) or more negative to about −1.2 volts. At this potential, iron, copper, and lead will be protected when exposed at the environmental condition to which they are exposed (natural conditions tend to be less aggressive than standard chemical conditions).

In some approaches, a potable water infrastructure and the iron-based infrastructure are lowered to the reduction potentials discussed herein, by connecting their grounding electrode to the AC supply ground wire having the reduction potentials discussed herein. This lowers the electric infrastructure system to about −1.0 to −2.0 volts ESG. This may be done at each AC stepdown transformer over an entire electrical supply grid or at least within a localized area or adjacent a structure desiring pipeline corrosion protection. Because this grounding is a component of an electrical grid, electrical power grounding is the same at all points of power use of the infrastructure. Thus, because the electrical grounding system is widely used to ground infrastructure systems, the selected potable water distribution system and iron infrastructure will be at the same reduction potential as discussed hereinabove. Consequently, the iron mains, and iron components of the potable water infrastructure, which in the past have not been protected from corrosion, will now be protected from corrosion and will continue to protect the potable water delivery system until it becomes obsolete. The unprotected iron surface of the infrastructure will also be protected from the ozone in acid rain water until the infrastructure becomes obsolete. The Cu, Pb, and Fe will be protected from corrosion by potable water.

An option to the grounding electrodes is an AC/DC rectifier transformer drawing power from the AC supply. In some embodiments, although upgrading the grounding potential at each stepdown transformer may give adequate potential coverage, it may be desirable to install an electrode and/or an AC/DC rectifier transformer at each point of electrical use. In some approaches, a small AC/DC rectifier transformer unit with a DC output of about 2 volts and 10 milliamps to 1 amp may be installed in each electrical entry service box. The necessary current and voltage boost will vary depending on the age of the infrastructure's installations.

Much of the need for local grounding is fore-stalled by lowering the electrical grid grounding potential to the reduction potential noted herein at points of electrical generation. This could be done by use of AC/DC rectifier transformers at each point of electrical generation.

In other approaches, the methods and systems herein include controlling corrosion of systems using lead pipe, so that less than about 1 ppb lead is added to the transported potable water when the systems and methods of the present disclosure are implemented. This protection system will protect new and heritage copper plumbing serviced by plastic mains from the current rapid corrosion development of pinhole leaks. The surface of the unprotected iron infrastructure now will be protected from the ozone and other materials in acid rain. Also, iron may be protected from coastal mist. With the systems and methods herein, the cost of collateral damage from excavating streets, traffic disruption, and damage to other surface structures may be avoided if piping systems need to be replaced due to corrosion because the methods and systems herein can be implemented mainly from ground surface.

TECHNICAL FIELD

This invention relates to potable water delivery systems, and more specifically, systems and methods for prevention of the interior and exterior corrosion of the iron, copper, and lead components of the system by the chemical redox reaction between the protective concentration of disinfection chemicals in all potable water and the iron, lead and copper metal pipes, and the maintenance and life extension of the potable water distribution infrastructure. The corrosion protection method of the potable water infra-structure is integrated with the iron-based infrastructure corrosion protection through the mutually-shared potential of the AC electrical grid's copper grounding matrix, designated as zero volts on the electrical voltage grounding scale. The potential of the potable water distribution system and iron infrastructure will be at the same potential as the electrical grid's copper grounding system of about +0.521 volts relative to a standard hydrogen electrode. The iron and less noble metals of the infra-structure are protected from corrosion by lowering the potential to about −1.2 volts, relative to the electrical grid's copper grounding electrodes. The exterior surfaces of the metal components are protected from corrosion by making them the cathode of an electrolytic cell. The overall grounding of the electric grid is considered to be: the system potable water distribution system, electrical grounding, and the iron-based infrastructure

BACKGROUND

I, Frank Seth Gaunce, have invented a system to prevent potable water distribution systems from corrosion by the protective concentration of disinfecting chemicals intentionally left in the potable water to protect its purity during delivery to point of use. Typically, the distribution systems are comprised of an iron main and distribution laterals of lead or copper, to point of use. This system is usually grounded to the electrical ground, as a safety measure, to prevent electrical shock of users.

The disinfecting chemicals (disinfectants) will corrode all three metals of the individual distribution systems even at the low protective concentrations (<1 to 4 PPMs) of the disinfectants. The metals are corroded in the order: iron, zinc, copper, which is the order of their reduction potentials. So long as the lead and copper are in contact with the iron main they are not corroded. They are not protected from corrosion by the disinfectant, electro-chemically, when iron is corroded away. When the iron is corroded away or removed, the lead and copper are next corroded. With the lead pipes, the corrosion is evidenced by the increased content of lead in the delivered water. In the case of copper, the corrosion tends to be very local, resulting in pipe pinhole corrosion leaks. For safety reasons, the metal components of the potable water system, and the iron components of the national infrastructure are typically grounded to the national grounding electrical grid matrix, which is ubiquitous wherever electricity is used. As a consequence, the potential of the potable system and the iron infrastructure are at the same potential as the electrical grid's copper grounding system which is an integral part of the electrical system.

It is recognized that the potable water supply infrastructure is electrically conductively integrated nationally, and already loosely integrated with the AC national electric grid. The grounding systems are already electrically interconnected and will assure the long-term protection of the potable water delivery systems, including those containing lead pipes. It is also recognized that corrosion of the protected lead pipes will not add lead to the potable water in quantities in excess of EPA standards. The NEARNEST equation predicts that at the zinc reduction potential and the protective concentration of disinfecting chemicals, the equilibrium concentration of lead in the potable water will be several multiples less then EPA's recommendations.

The chemical reactions with the disinfectants and the interior of metal pipes are redox reactions, which are electrolytically self-contained. That is, the reactants share electrons to produce reaction products without creating a shortage of, or an excess of electrons. The reactions go towards the lowest net energy state of the reactants and, hence, the direction of the reaction is controlled by the potential of the reactants. For corrosion prevention, the potential of the reactions is controlled in cathode mode by a sacrificial potential anode or other energy source, such as by an AC/DC transformer rectifier, supplied from the AC power supply. Preferably, the reaction potential will be from the electrical grounding systems, whose potential is raised to the reduction potential of zinc. Currently, the iron-based infrastructure is connected to the electrical grounding system which is at the grounded potential of copper, +0.521 volts, relative to a hydrogen electrode. Changing the grounding electrode from copper to zinc, changes the potential of the null point of the electrical grid from the half-cell reduction potential of copper, ++0.521 volts, to −0.76 volts, the reduction potential of zinc. These voltages are relative to a standard hydrogen electrode. A typical volt meter is scaled to zero volts at the copper grounding electrode potential of the national electrical grid.

When applying my patent, the copper grounding electrodes of the electric grid may stay in place to max-imize the safety of electrical operations personnel. The electric voltage unit, (Pe) can be changed to the thermodynamic voltage unit, (Te) by the following equations:

Te=(Pe×1.12)+0.521

Pe=(Te−0.521)×1/1.12

1 $v$·Te=1.51 $v$ Pe

The redox reactions between the participating metals and the disinfectant chemicals are as follows:
1. Iron Fe+HClO=FeCl$_2$+FeO+H$_2$O (Balanced)

2Fe+2HClO=FeCl$_2$+FeCl$_2$+H$_2$O

2. Lead

Pb+HClO=PbCl$_2$+PbO+H$_2$O (Balanced)

2Pb+2HClO=PbCl$_2$+PbO+H$_2$O

3. Copper

Cu+2HClO=CuCl+Cu$_2$O+H$_2$O (Balanced)

4Cu+2HClO=2CuCl+Cu$_2$O+H$_2$O

These are anodic redox reactions that occur at low reduction potentials. They will proceed spontaneously and corrode the interior of the iron, lead, and copper pipes, when at an anodic oxidation reaction potential. And, they can be prevented from reacting by raising the cathodic reduction potential to the reduction potential of zinc.

Many years of unfailing service by copper and lead potable water delivery pipes connected to iron mains attest to the fact that the reduction potential of iron protects copper and lead from corrosion by potable water. Since the copper and lead are corroded by the potable water, when the iron is removed from the system, and/or disconnected, or corroded away, it can be concluded that the copper and lead pipes are protected from corrosion by the iron main.

The iron mains of the water distribution system, protect the attached copper and lead delivery pipes from corrosion by the protective concentration of disinfectant left in the potable water. Some disinfect-ant is left in the potable water to protect its purity should it be contaminated during delivery to point of use. Over decades, the iron mains fail due to corrosion and must be replaced. Currently, it is common practice to replace the iron main with a non-electrically-conducting plastic main. This removes the cathodic corrosion protection against the disinfectants. As a consequence, the lead and copper are corroded by the potable water contaminating the potable water with unacceptable amounts of lead. The copper corrosion creates the currently unexplained pinhole corrosion water leaks.

Therefore, in order to maintain and extend the life of the potable water delivery system infrastructure, it is imperative to protect the iron mains from corrosion by potable water. This patent does that by raising the reduction potential of the iron/lead and the iron/copper systems above the iron/potable water (disinfectant chemicals) redox reduction potential. Typically, this will be at the reduction potential of a zinc metal anode. At the potential of zinc metal and/or zinc metal alkali metal alloys (Zn, Al, Mg), the potable water systems are protected from corrosion by potable water. The system potential will be −1 to −2 volts relative to a copper anode, when measured with a standard volt meter, or −0.76 volts when measured relative to a standard hydrogen electrode.

Since the copper piping normally is connected to the electrical grounding system and all metal components are electrically connected; the entire system will be protected from corrosion when the electrical grid's null point is lowered to the reduction potential of a zinc anode. Zinc alloy anodes of aluminum or magnesium with high reduction potentials may also be used to protect the zinc. These may also be used to counter potential line loss. When the null point of the national electrical grid is lowered below the reduction potential of zinc, most of the national metal infrastructure less noble than zinc will be protected from corrosion.

The previous comments relate primarily to protection of the interior of the potable water distribution piping and particularly to the iron mains since the iron protects the copper and lead in the absence other protective systems. The mode of interior corrosion is by a redox reaction between the protective concentration of disinfectants and the metal pipes. In the past, this has not been recognized as a corrosion problem for lead or copper, because they were protected by the iron mains. But, currently, as failing iron mains, due to corrosion, are being replaced with non-conductive plastic, the copper and lead delivery lines are failing. My system of lowering the electrical ground grid to −1.2 volts to protect the interior and the exterior of the iron mains, also protects the interior of the copper and lead pipes, in the absence of the iron main. It also protects dedicated sacrificial anodes. Also, my system protects the exterior of the potable water system, by acting as a cathode to the cathodic corrosion protection system. Furthermore, any iron that comes in contact with the potable water delivery system, intentionally or unintentionally, is protected from electrolytic corrosion.

The cathodic corrosion protection system uses a somewhat similar chemical system as the cathodic redox approach. This system is an electro-chemical cell where, in both, a potential and an electrical current is impressed on the cathode and returned to the sacrificial anode through a common electrolyte. The sacrificial anode can also act as a potential anode for directional control of a redox reaction.

Typical cathode corrosion protection cell reactions that protect the exterior of a metal cathode by a sacrificial anode follows:

$$Zn+Cu_2O=2Cu+ZnO \qquad (1)$$

$$Zn+FeO=Fe+ZnO \qquad (2)$$

$$Zn+PbO=Pb+ZnO \qquad (3)$$

$$Zn+H_2O=H_2+ZnO \qquad (4)$$

Equations 1 through 4 are cathodic, preventing the corrosion of the metal cathode. Copper, lead, and iron are more strongly protected in the order: copper most, iron least. When all locally metal ions have been reduced, the cathodic reactions stop and the system is stagnant at the reduction potential of zinc, with the following exception: when the soil (electrolyte) is acid, water may be reduced, producing hydrogen gas at the protected metal cathode and zinc oxide at the anode, as in equation (4).

The national potable water distribution systems, the iron-based infrastructure, and the electrical grid, are a loosely integrated electrical maze. My patent not only protects lead, copper, and iron from corrosion by potable water, but it also protects the external surface of the iron infrastructure from corrosion by ozone in acid rain. It also acts as a backup for protective coatings of iron things. My corrosion prevention system can be powered from the AC electrical grid through AC/DC transformer converters or alternately by multiple zinc-based anodes. The grounding potential of the entire electrical grid grounding is lowered to −1. to −1.2 volts relative to copper ground. At this potential, all metals more noble than zinc will be protected when exposed to environmental conditions (natural conditions tend to be less aggressive than standard chemical conditions).

Implementation: The entire potable water infrastructure, and the iron-based infrastructure, are lowered to the reduction potential of zinc, by connecting a grounded zinc electrode to the AC supply ground wire. This lowers the grounding wire voltage of the AC supply system −1. to −1.2+ volts, DC. This is done at each AC stepdown transformer over the entire electrical supply grid. Because this grounding is a component of the national electrical grid, electrical power grounding is the same at all points of power use of the national iron infrastructure. Thus, because the electrical grounding system is widely used to ground infrastructure systems, the national potable water distribution system and iron infrastructure will be at the same reduction potential as zinc. Consequently, the iron mains, and iron components of the potable infrastructure, which in the past have not been protected from corrosion, will now be protected from corrosion and will continue to protect the potable water delivery system until it becomes obsolete. The unprotected iron surface of the infrastructure will also be protected from the ozone in acid rain water until the infrastructure becomes obsolete.

An option to the zinc grounding electrode is an AC/DC rectifier transformer drawing power from the AC supply. Although upgrading the grounding potential at each stepdown transformer may give adequate potential coverage, it may be desirable to install a zinc electrode or an AC/D rectifier transformer at each point of electrical use. We visualize a small AC/DC rectifier transformer unit with a DC output capacity of about 2 volts and 10 milliamps amp installed in each electrical entry service box. The necessary current potential boost will vary with the age of the infrastructure's installations. Much of the need for local grounding is fore-stalled by lowering the electrical grid grounding potential to the reduction potential of zinc. This could be done by use of AC/DC rectifier transformers at each point of electrical generation, to lower the electrical grid null point to the reduction potential of zinc.

SIGNIFICANCE

Because of past and current practice, the potable water distribution systems are failing, due to corrosion, and they will continue to fail unless preventive action is taken. My method will prevent failure due to corrosion and allow competent systems to continue to be viable far into the future. When iron mains are being replaced with plastic mains the copper and lead plumbing heritage mains should be protected with my methods.

This includes controlling corrosion of systems using lead pipe, so that less than 1 ppb lead is added to the transported potable water. This protection system will protect new copper plumbing serviced by plastic mains from the current rapid corrosion development of pinhole leaks. Unprotected iron infrastructure now will be protected from the ozone and other materials in acid rain. Also, iron may be protected from coastal mist. Avoided, is the cost of the collateral damage resulting from excavating streets, traffic disruption, and damage to other surface structures since my system can be implemented mainly from the ground surface. Collateral costs can be much greater than the cost of replacing the failed pipes. This method of corrosion protection can protect existing competent systems by actions performed preemptively, thus avoiding a future failure requiring an emergency response. My system is applicable to the protection of the national potable water distribution and iron-based infrastructure. Implementation of my system is simple and can be done with little training by those knowledgeable in the art. The required basic materials are readily available, mostly "off the shelf."

Implementation of this protection system can be budgeted for and done in order of greatest benefit:

1) Failed lead delivery systems causing lead contamination of the potable water
2) New copper systems supplied by plastic mains
3) Still reliable distribution systems
4) Rejuvenation of partially failed systems My protection system can be installed on the potable water distribution infrastructure anywhere in the nation where resources are available and the need recognized. Corrosion goes on 24/7. The greatest benefit will be gained if this protection action is started now to competent systems and applied to all new installations and maintenance actions. Upgrading of existing systems can proceed independent of new installations and on-going maintenance. Because most of the metal infrastructure is electrically connected, it will be protected from corrosion when the grounding voltage is lowered from the current 0 volts to −1.2 volts.

CLAIMS

I claim: 1). Lower the voltage of the national electrical grid ground from 0 to −1.2 volts to protect from corrosion, the potable water distribution systems and the iron-based infrastructure. 2.) A method to protect iron, lead, and copper buried potable water distribution systems without the need for excavation. 3.) A method that extends the useful life of potable water distribution systems well into the future. 4.) The method of decreasing the potential of the potable water systems to the reduction potential of zinc, to protect the potable water systems from corrosion by the potable water. 5.) Lowering the grounding potential of the AC supply system from 0 volts to −1.2 volts by connecting a grounded zinc alloy electrode to the electrical system grounding wire. 6.) Lowering the grounding potential of the local AC supply system from 0 volts to −1.2 volts by using a variable output AC/DC rectifier transformer, supplied from the AC system. 7). Installation of an AC/DC rectifier transformer in all of the point of electrical service entry boxes, to boost as needed, to maintain the system's grounding potential, as in 6. 8.) As in 6, a variable output AC/DC rectifier transformer at the AC electrical stepdown service transformers, to lower the grounding potential of the electrical potable water distribution systems, and iron-based infrastructures. The grounding potential of the electrical, potable water distribution, and iron-based infrastructure 9.) Applying the described infrastructure protections while working at ground surface, thus negating the need to exhume the potable water delivery system for maintenance. 10.) Use of this system to protect metallic components electrically isolated by plastic components introduced during maintenance of the original system. 11.) An integrated AC supply grid and potable water distribution infrastructure system that protects the potable water distribution system and the iron infrastructure from corrosion over the long term. 12.) A method to protect iron from electrolytic environmental corrosion. 13.) Use of the integration of the potable water distribution infrastructure and the iron-based infrastructure to minimize corrosion by exposure to the environment. 14.) Installation of a variable potential output AC/DC rectifier transformer in each electrical entry service box, connected to the electrical ground system, to boost the grounding potential to the reduction potential of zinc or zinc alloy electrodes. 15.) Installation of a grounded zinc or zinc alloy electrode at each electrical entry box.

1A. In other embodiments, a system to change the ground potential of an AC electrical grid to reduce potable water pipeline corrosion from redox reactions of residual disinfecting is provided. The system comprising: potable water supply pipelines including at least one of copper pipelines, lead pipelines, iron pipelines, and combinations thereof and wherein the potable water supply pipelines include portions thereof that are free of iron mainlines, include corroded iron mainlines, or include combinations thereof, potable water flowing through the potable water supply pipelines, the potable water including residual levels of one or more disinfecting chemical therein; an AC electrical grid, a portion of the nul leg AC electrical grid conductively grounded to at least a portion of the potable water supply pipelines; and a grounded anode electrically directly connected to the AC electrical grid, the grounded anode of a material having a standard reduction potential of about −0.7 volts or less as referenced to a standard hydrogen electrode. The system of claim 1A, wherein the grounded anode has a standard reduction potential of about −0.7 to about −1.2 volts as referenced to a standard hydrogen electrode or about −1.2 volts as reference to a standard copper electrode. The system of claim 1A, wherein the grounded anode lowers a reduction potential of the AC electrical grid about 1.0 to about 2.0 volts below the standard reduction potential of copper. The system of claim 1A, wherein the potable water supply pipelines deliver potable water having no more than about 4 ppm of disinfecting chemicals including one of chlorine gas, hydrogen peroxide, hypochlorous acid or a salt thereof, and combinations thereof. The system of claim 1A, wherein the potable water supply pipeline includes portions thereof supplying the potable water within a turbulent flow regime having a Reynolds number greater than about 2100. The system of claim 1A, wherein the grounded anode is selected from a metal less noble than copper. The system of claim 1A, wherein the grounded anode is combined with a separate copper ground wherein both the grounded anode and the separate copper ground are directly electrically connected to the AC electrical grid. The system of claim 1A, further including a variable output AC rectifier transformer electrically connected to the AC electrical grid and to the grounded anode. The system of claim 1A, wherein a grounded anode is provided at the electrical entry box of the AC electrical grid to a building structure having the potable water supply pipelines. The system of claim 1A, wherein the variable output AC rectifier transformer is provided at the electrical entry box of the AC electrical grid to a building structure having the potable water supply pipelines. The system of claim 1A, wherein the potable water after passing through the system has levels of lead below about 15 ppb.

1B: A method of reducing the level of potable water pipeline corrosion by altering the ground potential of an associated AC electrical grid, the method comprising: lowering the ground potential of an AC electrical grid by at least about 1.0 volt below the standard ground potential of copper by directly connecting a grounded electrode to the AC electrical grid of a material having a standard reduction potential of about −0.7 or less volts as referenced to a standard hydrogen electrode; and the AC electrical grid conductively grounded to a potable water supply pipeline needing corrosion protection; wherein the potable water supply pipelines include at least one of copper pipelines, lead pipelines, and combinations thereof and wherein the potable water supply pipelines include portions thereof free of iron mainlines, include corroded iron mainlines, or include combinations thereof; wherein potable water is flowing through the potable water supply pipelines and includes residual levels of one or more disinfecting chemical therein; and wherein lowering the ground potential of the AC electrical grid reduces the level of corrosion in the potable water pipelines by reducing or preventing a redox reaction between one of the copper pipelines or the lead pipelines and the residual levels of one or more disinfecting chemicals within the potable water. The method of claim 1B, wherein the ground potential of the AC electrical grid is lowered at least about 1.0 to about 2.0 volts below the standard ground potential of copper. The method of claim 1B, wherein the grounded electrode has a standard reduction potential of about −0.7 to about −1.2 volts as referenced to a standard hydrogen electrode. The method of claim 1B, further including a variable output AC/DC rectifier transformer supplied from the AC system. The method of claim 1B, wherein an AC/DC rectifier transformer is installed within at least one point of service entry box to a structure having the potable water supply pipelines. The method of claim 1B, wherein the potable water supply pipelines deliver potable water having no more than about 4 ppm of disinfecting chemicals including at least hypochlorous acid or a salt thereof. The method of claim 1B, wherein the potable water supply pipeline includes portions thereof supplying the potable water within a turbulent flow regime having a Reynolds number greater than about 2100. The method of claim 1B, wherein the grounded anode is combined with a separate copper ground and wherein both the grounded anode and the separate copper ground are directly electrically connected to the AC electrical grid. The method of claim 1B, wherein the potable water has levels of lead below about 15 ppb after passing through the potable water supply pipelines.

ABSTRACT

This corrosion prevention approach extends the useful life of the existing potable water distribution infrastructure and the iron-based infrastructure.

The potable water distribution systems and the national iron-based infrastructure are inter-connected by the electrical grounding grid. Consequently, both the potable water distribution system and the iron infrastructure are maintained at the grounding potential of the electrical grid. The existing grid potential null points are grounded to copper electrodes and arbitrarily defined as zero potential. Whereas, the reduction of metallic copper is +0.521 volts relative to the standard hydrogen electrode. This potential (+0.521) volts) is not protective of the iron or the potable water distribution system. To protect the iron from corrosion, the grounding potential of the electrical grid is lowered to at least −1.2 volts (the reduction potential of zinc relative to a copper ground electrode.) The potential input to the grounding grid is boosted at multiple points to maintain the grid's grounding potential at the reduction potential of a grounded zinc electrode. Metallic ground surface features are used to access underground piping, while working at surface to install electrolytic corrosion protection. The electric voltage (Pe), is changed to the thermodynamic voltage unit (Te) by the following equations:

$$Te=(Pe\times 1.2)+0.521$$

$$Pe=(Te-0.521)\times 1/1.12$$

$$1\ V\ Te=1.51\ V\ Pe$$

Thermodynamic voltage (Te) is relative to hydrogen electrode. Electric voltage (PE is relative to a grounded copper electrode.

These claims do not apply to pooled water exposed to the atmosphere, because evaporation concentrates the corrosives beyond chemical capability of the method.

It is noted that, as used in this specification and the appended claims, the singular forms "a," "an," and "the," include plural referents unless expressly and unequivocally limited to one referent. Thus, for example, reference to "an anode" includes two or more different anodes. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

As used herein, directly means connected to without any intervening structure or components. Thus, as discussed herein, the grounding electrodes are directly connected and/or directly electrically connected to the nul leg AC electrical grid.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. An integrated AC electrical supply and potable water distribution system comprising:
   potable water pipelines within a building structure and including at least one of copper pipelines, lead pipelines, iron pipelines, and combinations thereof, and wherein the potable water pipelines include portions thereof that are free of iron mainlines;
   potable water flowing through the potable water pipelines, the potable water including residual levels of one or more disinfecting chemical therein;
   an AC electrical supply connected to the building structure having the potable water pipelines, wherein said AC electrical supply includes a copper grounding electrode, and a portion of the AC electrical supply copper grounding electrode conductively connected to at least a portion of the potable water pipelines; and
   an additional grounding electrode of a different material than the copper grounding electrode connected to the copper grounding electrode of the AC electrical supply,
   a ground voltage of the AC electrical supply of −1.2 volts or below as referenced to a standard copper electrode; and
   wherein no external electrical current is generated between the grounding electrodes and the potable water pipelines and wherein the ground voltage of −1.2 volts or below protects inner surfaces of the potable water pipelines from corrosion by a redox-reaction of the one or more disinfecting chemicals.

2. The system of claim 1, wherein the additional grounding electrode is a grounded zinc alloy electrode.

3. The system of claim 1, wherein the potable water distribution system includes plastic mainlines and the potable water pipelines are electrically isolated through connections to the plastic mainlines.

* * * * *